United States Patent [19]

Richards et al.

[11] 4,035,235

[45] July 12, 1977

[54] METHOD OF MAKING LIPOPHILIC STARCH DERIVATIVES

[75] Inventors: Charles N. Richards, St. Louis County; Clifford D. Bauer, St. Louis, both of Mo.

[73] Assignee: Anheuser-Busch, Incorporated, St. Louis, Mo.

[21] Appl. No.: 340,165

[22] Filed: Mar. 12, 1973

[51] Int. Cl.$^2$ .................. C12D 13/02; C08B 31/04
[52] U.S. Cl. ................. 195/31 R; 426/96; 426/651; 536/48; 252/522
[58] Field of Search ............... 195/31 R; 260/233.5; 426/48, 98, 658, 651, 96; 536/48, 49

[56] References Cited

U.S. PATENT DOCUMENTS

| | | | |
|---|---|---|---|
| 2,613,206 | 10/1952 | Caldwell | 260/233.5 |
| 3,091,567 | 5/1963 | Wurzburg et al. | 426/98 X |
| 3,557,091 | 1/1971 | Martin | 260/233.5 |
| 3,689,361 | 9/1972 | Speakman | 195/31 R |

FOREIGN PATENT DOCUMENTS

| | | | |
|---|---|---|---|
| 404,948 | 1/1967 | Australia | 195/31 R |
| 691,364 | 5/1953 | United Kingdom | 260/233.5 |

*Primary Examiner*—Raymond N. Jones
*Assistant Examiner*—Thomas G. Wiseman
*Attorney, Agent, or Firm*—Gravely, Lieder & Woodruff

[57] ABSTRACT

This disclosure involves a method of making lipophilic modified starch derivatives that are suitable for encapsulating fats and oils and producing stable emulsions. The starch has a reduced viscosity with both hydrophobic and hydrophilic properties. The process of preparing the starch derivatives includes the steps of esterification of the starch with n-octenyl succinic anhydride, washing, enzyme modification and drying. The enzyme modification is critical to the invention.

4 Claims, No Drawings

METHOD OF MAKING LIPOPHILIC STARCH DERIVATIVES

BACKGROUND OF THE INVENTION

The use of volatile flavoring oils and perfumes in such applications as foods and cosmetics is often greatly hampered by the rapid evaporation and loss of the volatile component. The losses detract from the desirability as well as from the utility of the products concerned.

Techniques used to overcome this problem generally involve the preparation of solid compositions containing the volatile ingredient entrapped therein. These compositions may be prepared by mixing the volatile oil with a suitable absorbent base. In another method, the volatile materials are dispersed by mixing and emulsification with solutions of various protective colloids, such as natural gums, e.g., water-dispersible gum arabic.

The encapsulated particles, in these applications, have been characterized by their extreme water solubility. This property has been considered essential in order to make possible the ready release of the entrapped flavor as the encapsulated particles are moistened or dispersed in water.

U.S. Pat. Nos. 3,091,567, and 2,661,349, and 2,613,206 disclose starch acid-ester encapsulating agents which are dispersible in water and form a water repellant film upon drying. The starches disclosed in these patents are modified by acid-treatment to produce high fluidity and thin-boiling characteristics. The acid treatment process is time consuming and frequently results in damage to storage tanks.

It is an object of this invention to produce encapsulating agents which are water-dispersible and form films with the proper hydrophobic-hydrophilic balance upon drying to provide a gradual or controlled release of the substance entrapped by the encapsulating agent.

Another object of the present invention is to make a thin-boiling starch by controlled modification of the starch by enzyme treatment. Yet another object of the present invention is to produce a spray-dried enzyme converted starch reaction product which may be used in the form of an aqueous dispersion with an oil to form a stable emulsion. The oil-in-water emulsion may be dried and later reconstituted to provide a stable emulsion.

When resuspended in water, the spray-dried product causes a cloud effect. The cloud effect is an opaqueness in the fluid which is used in certain types of drinks made from dried flavorings. Gum arabic also has this cloud effect.

SUMMARY

The present invention comprises an enzyme converted waxy starch derivative suitable for encapsulating fats and oils and producing stable emulsions. The present invention further comprises a process of making said lipophilic starch by dispersing the starch in water, esterifying, enzyme modifying, and drying.

DETAILED DESCRIPTION

The starch used is waxy maize, tapioca, dent, potato, wheat, rice, or other starches. The preferable starch is waxy maize. The starch is treated with a substituted cyclic dicarboxylic acid anhydride of the following structural formula:

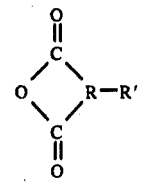

wherein R represents a dimethylene or trimethylene radical and wherein R' is the substituent group, which is a hydrophobic group (ordinarily a long chain hydrocarbon radical). Substituted cyclic dicarboxylic acid anhydrides falling within the above structural formula are the substituted succinic and glutaric acid anhydrides.

The hydrophobic substituent group R' may be alkyl, alkenyl, aralkyl, or aralkenyl and should contain 5 to 18 carbon atoms. R' may be joined to the anhydride moiety R through a carbon-to-carbon bond (as in alkenyl succinic anhydride) or through two carbon-to-carbon bonds (as in the adduct of maleic anhydride with methyl pentadiene, or as in the cyclo-paraffinic cyclo-dicarboxylic acid anhydrides, such as for example, cyclohexane, 1,2-dicarboxylic acid anhydride, or may be linked through an ether of ester linkage (as, for example, in octyloxy succinic anhydride or in capryloxy succinic anhydride). Regardless of the particular linkage between the hydrophobic substituent R' and the anhydride proper, all of the above-listed types fall within the class of substituted succinic or glutaric anhydrides. In the place of the organic acid anhydrides mentioned above, one may also use the substituted dicarboxylic acid chlorides of those dicarboxylic acids which form cyclic anhydrides, such as, for example, alkenyl succinic acid chloride. Such is included in the term dicarboxylic acid anhydride. Also, the term starch acid ester of substituted dicarboxylic acid, such as succinic or glutaric, includes the alkali metal salt of such acid ester.

The products formed by the reaction of starch with any of the above-listed reagents are the acid esters of the substituted dicarboxylic acids and, more specifically, they are the acid esters of either substituted succinic or glutaric acid. These acid esters may be represented by the following structural formula:

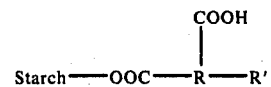

wherein R is a dimethylene or trimethylene radical and R' is the substituent hydrophobic group (this being an alkyl, alkenyl, aralkyl, or aralkenyl group containing from 5 to 18 carbon atoms). The hydrophilic group in all cases is the remaining free carboxyl group (COOH) resulting from the esterification of only one of the carboxyl groups.

In making the starch derivative of this invention at least 2%, and preferably at least 3% (based on the weight of dry starch), of n-octenyl succinic anhydride must be used in order to give a product which has the desired emulsifying, coating, and clouding properties. Varying amounts of other anhydrides, depending on the molecular weight thereof, are used. Generally, from about 0.1% to about 10% by weight anhydride is added to the starch, based on the dry weight of starch.

The pH of the starch-substituted cyclic dicarboxylic acid anhydride reaction should be adjusted to the range of about 5 to about 11. Preferably the pH is adjusted to 7 to 8 by the addition of an alkaline solution of sodium hydroxide, sodium carbonate, or any alkali metal base.

After the pH of the starch slurry is adjusted as mentioned, from about 0.1% to about 100% (by weight based on the weight of dry starch) of substituted cyclic dicarboxylic acid anhydride is added. Preferably, n-octenyl succinic anhydride is used in the amount of about 2% to about 5%.

After the pH is stabilized, the slurry is kept in a range of about 60° to about 130° F., preferably about 75° F., for about 1 to about 10 hours to complete the reaction. The reacted starch is then washed and filtered. The water washing removes impurities and provides for a better flavored product. The preferred starch reaction product has about 2 to about 3% n-octenyl succinyl substitution. The percent substitution depends upon the amount of reactant and the efficiency of the reaction.

The modified starch preferably is resuspended in water at about a 35% solids concentration. The concentration can be from about 10 to about 50% solids. A starch conversion enzyme, preferably alpha amylase (liquifying enzyme) is added to the starch suspension. The amount of enzyme used depends on activity, time of reaction, pH, temperature, degree of conversion desired, use of activators, etc.

The enzyme treatment decreases the viscosity of the starch suspension to the desired level for the final product. The enzyme treatment is at a temperature of about 60° to about 100° C., or higher for very heat stable enzymes. This temperature is above the temperature at which the starch starts to swell. The swelling allows the enzyme to attack the granular starch to depolymerize the starch ester. The starch is partly cold water soluble because of the breaking up of the starch polymers by the enzyme. A molecular dispersion of the starch occurs after depolymerization the enzyme.

In a preferred method, the enzyme is added to the starch below the temperature at which the starch starts to swell. The temperature of the starch-enzyme mixture is increased and the enzyme acts on the starch as it starts to swell or gelatinize. This keeps the starch slurry from thickening unduly, as the enzyme is thinning the starch as it starts to swell.

In other processes the starch is gelatinized before the enzyme is added. Also, a continuous conversion process can be used for the enzyme conversion step.

The viscosity of the finished product depends on the enzyme used, the temperature and time of reaction, and the characteristics desired in the final product. For the preferred product, waxy starch n-octenyl-succinate, the viscosity is about 125 to about 500 as measured by a Brookfield method at spindle 2 speed 20 rpm at 30% concentration and 25° C. temperature.

Deactivation of the alpha amylase is needed to control the reaction to prevent the desired viscosity of the starch from changing. The enzyme is deactivated by the application of heat and/or the addition of sodium hypochlorite. A small amount of oxidation of the starch molecule may occur from the sodium hypochlorite. The sodium hypochlorite may also purify the starch by killing bacteria.

Either heat or sodium hypochlorite alone also will inactivate the enzyme. However, the reaction generally is run in huge tank reactors and it takes time to heat up the mass in the reaction vessel to a temperature sufficient to deactivate the enzyme. It usually is necessary to stop the reaction in a short span of time to prevent over thinning. The sodium hypochlorite has a tendency to decrease the action of the enzyme rapidly and allows time for the heat to build up and completely stop the enzyme activity. Thus, the combination is more efficient. Other inactivating systems also will work, such as $H_2O_2$, copper salts, potassium permanganate, ammonium persulfate, etc. Sodium hypochlorite also has the advantages of acting to purify the starch and inhibiting bacteria formation.

When using the alpha amylase of the following examples, Rhozyme 86L, the following conditions are preferred:

The temperature is raised to about 90° to about 100° C. for about 10 to about 45 minutes, Preferably, the temperature is maintained from 90° C. to 94° C. for 30 minutes. The amount of sodium hypochlorite added is from about 0.01% to about 0.25% by weight based on the weight of dry starch.

The modified starch is then spray-dried using an inlet temperature of about 175° to about 700° F. (preferably about 500° F.), and an outlet temperature of about 150° to about 350° F. (preferably 225° F.). Inlet and outlet conditions are selected so that desired drying is effected and no undesirable damage (browning, charing, etc.) occurs to the product. Any drying technique, such as passing over heated drums may be used, but spray drying is a preferred method for waxy starch-n-octenyl succinate.

EXAMPLE NO. 1

A water slurry of 250 lbs. (dry basis) of waxy starch is made. The starch has a Baume of 20.8 and is at a temperature of 74° F., and a pH of 7.5.

N-octenyl succinic anhydride (7.5 lbs.) is added and the pH is kept at 7.5 ± 0.2. When the pH stabilizes, the slurry is diluted to 16.1 Be and the pH adjusted to 7.0. This reaction takes 1 hour. The slurry is then filtered using a string filter and the cake is reslurried to 16.0 Be, pH adjusted to 5.4, filtered, and dried in a tray dryer at 220° F.

To produce the finished product, four lots of the modified waxy starch are enzyme converted and spray-dried. For each lot, 60 lbs, of modified waxy starch is slurried to give a 35% solids slurry. The pH is adjusted to 6.0 ± 0.2 and 2.7 g. of Rhozyme 86L (an alpha amylase made by Rohm & Haas) is added. The temperature is raised to 80° C., and after 2 hours, the Dudley viscosity is 120 sec. A solution containing 13.6 gm. of sodium hypochlorite is added and the temperature is raised to 94° C. and held for 45 minutes. The material is then spray-dried, using an inlet temperature of 500°–550° F. and an outlet temperature of 240°–250° F.

Table I lists the viscosity data for the enzyme converted, spray-dried lipophilic starch of Example No. 1. It is noted that the viscosity remains fairly constant after the starch derivative sets for 24 hours.

TABLE I

| | | | Brookfield Viscosity | | |
|---|---|---|---|---|---|
| Sample | pH | Spindle/ Speed | Before Heating | After Heating to 180° F. | After 24 hrs. |
| 1 | 4.2 | 3/20 | 180 | | |
| | | 2/20 | | 136 | 138 |
| | | 1/20 | | 218 | 235 |

TABLE I-continued

| Sample | pH | Spindle/Speed | Brookfield Viscosity Before Heating | After Heating to 180° F. | After 24 hrs. |
|---|---|---|---|---|---|
| 2 | 5.4 | 2/20 | 272 | 200 | 192 |
| 3 | 5.2 | 1/20 | 333 | 255 | 244 |
|   |     | 2/20 | 152 | 128 | 128 |
| 4 | 5.0 | 1/20 | 218 | 222 | 226 |
|   |     | 2/20 | 144 | 136 | 136 |

EXAMPLE NO. 2

One hundred (100) parts of waxy maize starch is slurried to a Baume of 21.0. Three (3) parts of n-octenyl succinic anhydride is added to the starch slurry and the pH is kept between 7.0 and 8.0 with a basic solution (70 g. NaOH — 150 g. $Na_2CO_3$ per liter). The temperature is kept at 75° F. When the pH is stabilized, the starch is washed and filtered. The modified starch (10,000 parts) then is resuspended in water to a 35% solids suspension. One (1.0) part of an alpha amylase, Rhozyme 86L, is added to the suspension. The temperature is raised to 80° C. until a Dudley viscosity of about 120 seconds at 80° C. is achieved. Then (5.0) parts of sodium hypochlorite is added and the temperature is raised to 94° C. for 30 minutes. The starch is then spray dried using an inlet temperature of 500° F. and an outlet temperature of 225° F.

The product, when mixed with coconut oil in a 1:1:2 (Starch: coconut oil: $H_2O$) ratio and emulsified, forms stable emulsions.

EXAMPLE NO. 3

Six (6) 50 lb. lots of lipophilic starch were prepared in accordance with the procedure of Ex. No. 1, enzyme converted, and spray-dried. Table II lists the viscosity data for these samples.

TABLE II

| Sample | pH | Spindle/Speed | Brookfield Viscosity Before Heating | After Heating to 180° F. | After 24 hrs. |
|---|---|---|---|---|---|
| 1 | 4.1 | 2/20 | 240 | 184 | 160 |
| 2 | 3.9 | 2/20 | 176 | 176 | 136 |
| 3 | 4.4 | 2/20 | 256 | 216 | 200 |
| 4 | 4.5 | 2/20 | 168 | 152 | 120 |
| 5 | 4.7 | 2/20 | 192 | 160 | 144 |
| 6 | 4.0 | 2/20 | 240 | 192 | 176 |

EXAMPLE NO. 4

Sixty-two (62) pounds of lipophilic starch was prepared in accordance with the procedure of Example No. 1. The enzyme conversion differed slightly in that it was stopped after reaching a Dudley viscosity of 203 seconds. The spray-drying was carried out with an inlet temperature of 580°–600° F. and an outlet temperature of 230° F. This modification in the procedure produced a finished product with a higher viscosity. The Table lists the pH and viscosity data for this Example.

TABLE III

| Sample | pH | Spindle/Speed | Brookfield Viscosity Before Heating | After Heating to 180° F. | After 24 hrs. |
|---|---|---|---|---|---|
| 1 | 4.3 | 2/20 | 424 | 392 | 420 |

Thus, it is seen that the present invention achieves all of the objects and advantages sought therefor. This invention is intended to cover all changes and modifications of the examples of the invention herein chosen for purposes of the disclosure which do not constitute departures from the spirit and scope of the invention.

What is claimed is:

1. A method for producing a lipophilic derivative of starch to be used in encapsulating water-insoluble substances which comprises
  a. reacting in an alkaline aqueous medium granular waxy starch and a substituted cyclic dicarboxylic anhydride having the following formula:

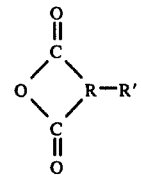

wherein R is a radical from the class of dimethylene and trimethylene radicals and R' is the substituent group from the class consisting of an alkyl, alkenyl, aralkyl and aralkenyl to produce a granular starch reaction product which is the acid ester of the substituted dicarboxylic acid having a degree of substitution of about 2–3%,
  b. recovering the granular starch reaction product,
  c. washing the granular starch reaction product of step b,
  d. treating the washed granular starch reaction product with an alpha-amylase enzyme treatment which gelatinizes and depolymerizes the granular starch reaction product to produce a dispersion of the lipophilic derivative of starch in water which derivative has said degree of substitution and has a viscosity of about 125 to about 500 as measured by a Brookfield method at spindle 2 speed 20 RPM at 30% concentration and 25° C temperature.

2. The method of claim 1 in which the enzyme is inactivated by the addition of sodium hypochlorite and/or heat.

3. The method of claim 1 in which the starch derivative is spray-dried.

4. The method of claim 1 wherein the anhydride is n-octenyl succinic anhydride.

* * * * *